Patented Feb. 22, 1927.

1,618,371

UNITED STATES PATENT OFFICE.

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE.

DISINFECTANT AND PROCESS OF MAKING SAME.

No Drawing. Application filed February 19, 1924. Serial No. 693,901.

This invention relates to fungicides and seed disinfectants and to a process of making the same, and comprises as new products insoluble copper compounds deposited by reaction of soluble copper compounds with, and precipitation upon, bases or weak-acid salts of the alkaline earth metals including aluminum, magnesium and other equivalents in addition to calcium, strontium and barium.

Copper carbonate has in recent years found application with good results in the combating of certain smut diseases affecting cereal crops. This effect of an insoluble material is surprising, since its disinfectant properties are such as belong usually to the soluble copper salts. This property is due to, and is a function of, the fineness of subdivision of the product, for coarsely ground material has little or no such effect.

I have now discovered that the surface area, upon the relative magnitude of which depends the real value and effectiveness of our products, can be very greatly increased and the efficiency of a given amount of copper thereby greatly enhanced, at the same time materially lessening the cost of seed or soil treatment, by a process involving the interaction of a soluble salt of copper and a water suspension of a very finely ground compound having more or less pronounced basic properties, and of a very low order of solubility, such, for example, as oxides, hydroxides, carbonates, or other weak-acid salts of the alkaline earth metals, aluminum, or the like. By this action the copper salt is transformed into a salt of the material in suspension, or into a basic salt, or into a copper base, or into any mixture of such transformation products, practically all of which compounds are insoluble in water, as shown by the usual ammonia test for soluble copper compounds. These new copper compounds, formed by precipitation and deposited upon the finely-divided secondary material, thus are present in the form of a thin coating covering the particles of the material in suspension, which acts as a carrier for the copper compound or compounds. The active ingredient of such a composition is thus developed into a form in which its potent, surface area is relatively enormous, so that the total effective proportion of the copper compound originally employed is very greatly increased, and its efficiency in killing, for instance, the spores of smuts, is brought to a very high order.

The invention may be illustrated more in detail by the following example:

1000 parts of finely powdered calcium carbonate are suspended in 4000 parts of water with good agitation, and the suspension is treated with a solution of 500 parts of crystalline copper sulfate in 2000 parts of water, followed by thorough agitation. After ½ to 1 hour, an ammonia test of the filtrate of a portion should show no copper, and the $CaCO_3$ should take on a blue-green color. After filtering and drying, the mass is finely ground. The grinding serves to separate the particles that have cohered into lumps during the coating treatment, and does not remove the coating from the particles. The product contains 9–10% of copper as strongly basic carbonate; its activity as a fungicide is equivalent to that of pure basic copper carbonate containing about 50% of copper.

In place of copper sulfate I may use other soluble copper salts such as the acetate, for example; and for calcium carbonate there may be substituted such materials, for example, as magnesium oxide, magnesium carbonate, tri-calcium phosphate, calcium hydroxide or barium carbonate, with formation of the corresponding copper compound or compounds.

These new products may be used advantageously for seed or soil treatments in dust form either alone or mixed with other fungicides.

I claim:

1. The process of making a seed disinfectant which comprises bringing a water-soluble copper compound into intimate contact with a water suspension of a finely ground, relatively water-insoluble material having basic properties, and allowing the copper compound to react with the basic material to thereby form and deposit an insoluble copper compound as a coating on the particles of basic material in suspension.

2. A process as set forth in claim 1 in which the liquid mixture containing basic particles coated with a water-insoluble copper compound is filtered, and the residue dried and comminuted.

3. A process as set forth in claim 1 in which the water-soluble copper compound is copper sulfate.

4. A process as set forth in claim 1 in which the material having basic properties is an alkaline earth metal carbonate.

5. A process as set forth in claim 1 in which the material having basic properties is calcium carbonate.

6. As a new composition, a fungicide and seed disinfectant comprising finely divided water-insoluble material having surface layers of a water-insoluble copper compound, deposited on said water-insoluble material by the addition thereto of a water-soluble copper compound.

7. A fungicide and seed disinfectant as set forth in claim 6, in which the water-insoluble material is calcium carbonate.

8. A fungicide and seed disinfectant as set forth in claim 6, in which the copper compound is copper carbonate.

9. A fungicide and seed disinfectant as set forth in claim 6, in which the water-insoluble material is calcium carbonate, and the copper compound is copper carbonate.

10. As a new composition, a fungicide and seed disinfectant comprising finely divided particles of calcium carbonate with copper carbonate deposited thereon by the addition thereto of a water-soluble copper compound.

11. As a composition of matter, seed having intimately associated therewith a fungicide and disinfectant comprising finely divided water-insoluble material having surface layers of a water-insoluble copper compound, deposited on said water-insoluble material by the addition thereto of a water-soluble copper compound.

12. The composition of matter set forth in claim 11 in which the finely divided water-insoluble material is calcium carbonate.

13. The composition of matter set forth in claim 11 in which the copper compound is copper carbonate.

14. The composition of matter set forth in claim 11 in which the finely divided water-insoluble material is calcium carbonate and the copper compound is copper carbonate.

In testimony whereof I affix my signature.

MAX ENGELMANN.